United States Patent [19]

Okamoto et al.

[11] Patent Number: 5,902,348
[45] Date of Patent: May 11, 1999

[54] METHOD AND SYSTEM FOR DERIVING TRAVEL DISTANCE OF VEHICLE

[75] Inventors: Tatsuya Okamoto; Toshiharu Baba; Motoki Ishiguro; Hitoshi Kaneko; Masahiko Sakaguchi; Junichi Nishida, all of Saitama-ken, Japan

[73] Assignee: Pioneer Electronic Corporation, Japan

[21] Appl. No.: 08/847,032

[22] Filed: May 1, 1997

[30] Foreign Application Priority Data

May 2, 1996 [JP] Japan ................................. 8-111703

[51] Int. Cl.[6] .................................................. G06G 7/78
[52] U.S. Cl. .......................... 701/201; 702/149; 356/28; 356/5.08
[58] Field of Search .............................. 701/70, 93, 123, 701/200, 201; 702/140, 148, 149, 160, 142, 150; 73/114, 146.5, 490; 324/166, 207.12, 175, 178, 160; 356/5.01, 5.1, 2.8, 5.08

[56] References Cited

U.S. PATENT DOCUMENTS

| | | | |
|---|---|---|---|
| 3,701,151 | 10/1972 | Sato et al. | 342/109 |
| 3,735,260 | 5/1973 | Hartline et al. | 324/175 |
| 3,991,368 | 11/1976 | Powell | 324/166 |
| 4,197,585 | 4/1980 | Moorey et al. | 702/149 |
| 4,229,695 | 10/1980 | Bassi | 324/166 |
| 4,371,940 | 2/1983 | Yamaki et al. | 701/201 |
| 4,387,299 | 6/1983 | Akiyama | 324/175 |
| 4,390,948 | 6/1983 | Mori et al. | 701/201 |
| 5,222,024 | 6/1993 | Orita et al. | 701/93 |

*Primary Examiner*—Jacques H. Louis-Jacques
*Attorney, Agent, or Firm*—Finnegan, Henderson, Farabow, Garrett & Dunner, L.L.P.

[57] ABSTRACT

A method and system for deriving a travel distance of an object which travels. As one aspect, a travel velocity of the object producing a pulse signal in response to travel of the object on the basis of a number of pulses of the pulse signal per unit time is calculated, and a plurality of unit travel distances corresponding to a plurality of travel states of the object every travel state are calculated. The plurality of travel states are different from each other and the unit travel distance is a travel distance per pulse calculated by dividing the calculated travel velocity by the number of the pulses of the pulse signal per unit time. And the plurality of calculated unit travel distances are memorized individually, from the plurality of memorized unit travel distances, the unit travel distance corresponding to the travel state of the object which is under travel is selected, and the travel distance of the object on the basis of the selected unit travel distance and the pulse signal is derived.

12 Claims, 8 Drawing Sheets a: COUNT WHEN UNIT TRAVEL DISTANCE CONVERGES

FIG. 2

FIG. 3 a: COUNT WHEN UNIT TRAVEL DISTANCE CONVERGES

| n | STAND-ALONE NAVIGATION POSITION-MEASURING SYSTEM (PULSE NUMBER/SEC.) | GPS POSITION-MEASURING SYSTEM (GPS VELOCITY, km/h) |
|---|---|---|
| 1 | ±5 | ±2.5 |
| 2 | ±5 | ±2.45 |
| 3 | ±5 | ±2.4 |
| 4 | ±5 | ±2.35 |
| 5 | ±5 | ±2.30 |
| 6 | ±4.5 | ±2.25 |
| ⋮ | ⋮ | ⋮ |
| m−1 | ±0.5 | ±0.25 |
| m | ±0.5 | ±0.20 |
| ⋮ | ⋮ | ⋮ |

METHOD AND SYSTEM FOR DERIVING TRAVEL DISTANCE OF VEHICLE

BACKGROUND OF THE INVENTION

1. Field of the Invention

The present invention relates to a method and system for deriving a travel distance of an object which travels, such as vehicles, and more particularly to the method and system which employ a combination of measurement of the travel distance based on a reception of position-measuring electric waves and measurement of the travel distance based on a stand-alone manner.

2. Description of the Related Art

At present, there are known navigation systems functioning as position-measuring devices for various vehicles such as automobiles, airplanes or ships. The navigation systems are generally constructed such that they display a position mark representing the current traveling position of a driver's vehicle at a determined point on a map including the current traveling position of the vehicle in a superimposed manner, so as to guide the driver in determining travel routes to a desired destination. In terms of the principle of operation, vehicle navigation systems are generally classified into two types: stand-alone type navigation systems and GPS (Global Positioning System) type navigation systems.

In the former navigation systems, a travel direction and a travel distance of a vehicle are determined on the basis of outputs of a velocity sensor and an angular velocity sensor both installed in the vehicle, the determined data regarding the direction and distance are added to data of a preset reference position to obtain a current traveling position, and data of the calculated current traveling position are used to place a mark in the superimposed manner, on a map displayed on a monitor.

In the latter navigation systems, position-measuring electric waves are received from a plurality of GPS satellites which have been launched into space, data of the received electric waves are used to calculate a current traveling position of a driver's vehicle through the three dimensional or two dimensional measurement technique, and data of the calculated current traveling position are used to place a position mark on a necessary map displayed by a monitor display screen in the superimposed manner.

Still, a recent tendency shows that a third type, called a hybrid type vehicle navigation system, having functions of both the standalone and the GPS types has been in common use.

The foregoing vehicle navigation systems permit the user (driver) to recognize a current traveling position of his vehicle in conjunction with a map around the current traveling position. As a result, if the driver is not very familiar with the area, he can get enough navigation information to reach a desired destination.

In addition to the foregoing method utilizing the position-measuring electric waves, the foregoing vehicle navigation systems may employ another method for calculating the travel distance of vehicles. Specifically, in such another method, a pulse signal outputted in response to the rotation of wheels (i.e., rotation of wheel shafts) is used to convert a travel velocity (km/h) measured using the position-measuring electric waves into velocity per second. The velocity per second thus obtained is divided by the number of pulses of the pulse signal, thus obtaining a travel distance per pulse (m/pulse) (hereinafter, referred to as "unit travel distance"). Multiplying the calculated unit travel distance by the total number of pulses detected during the travel produces a travel distance in a stand-alone manner.

In actual applications, however, calculating the travel distance obtained based on the position-measuring electric waves may pose some problems regarding its accuracy. For example, a variety of factors including changes in the number of GPS satellites usable for measuring positions and/or changes in reception states of position-measuring waves owing to surroundings around a current traveling position of a vehicle sometimes prevent travel distances from being calculated in high accuracy. Still, when vehicles run through shadowed places, such as tunnels, where position-measuring electric waves are hardly received, it frequently occurs that distances which a vehicle has moved during travel with receiving no position-measuring electric waves are not counted, thereby increasing errors of travel distances if such occasion happens. Thus, in the case of the foregoing hybrid-type vehicle navigation system, in normal operation, the unit travel distance is updated and held to calculate travel distances based on not only the number of pulses of a pulse signal produced in response to vehicle's travel but also the unit travel distance. If required, the unit travel distance held at that time will be corrected for error-less calculation of travel distances using the position-measuring electric waves.

Such configuration, where travel distances calculated in the stand-alone manner using regularly updated unit travel distances are corrected with a travel distance calculated based on position-measuring electric waves, provides higher accuracy in obtaining travel distances of vehicle.

However, there is another problem in calculation of travel distances based on the above-mentioned pulse signal. This problem, resulted from the fact that the unit travel distance is affected and changed by changes in travel states of a vehicle, is that accurate calculation of travel distances is not always guaranteed.

Various drawbacks concerning the errors of travel distances due to the travel state changes will be explained in detail for automobiles regarded as vehicles. The first drawback is concerned with seasonal kinds of tires. Winter tires and summer tires are different in diameter and air pressure from each other. Hence, for example, when driving in winter season, exchanging summer tires for winter tires inevitably produces a different unit travel distance. In this situation, the unit travel distance after the tire exchange will be updated based on the unit travel distance calculated based on the summer tires. Since there is a large difference in the unit travel distance between summer tires and winter tires, it takes excessive time for updating the unit travel distances. As a result, there are produced large errors of the unit travel distances during such excessive time interval (until it begins to obtain the unit travel distance suitable for the winter tires). The first drawback is therefore that proper calculation of travel distances cannot be made.

The second drawback is also directed to tire exchanges. Even if unit travel distances suitable for the winter tires are obtained after being exchanged for the winter tires, there is some possibility that travel states are changed by, for example temporarily applying chains to tires or slipping of tires. In this case, the update of unit travel distances will be made under chain-applied tires or slipped tires. Although such applying chains or slipping is a short-term event, unit travel distances discontinuously changes after removing the chains or end of the slip. Therefore, until a suitable unit travel distance for the winter tires is again obtained, the unit travel distances with larger errors will last, thereby providing the second drawback that travel distances cannot be calculated properly.

The third drawback arises when automobiles go backward. When automobiles normally go backward by setting the shift lever to the reverse position in the transmission, a backward travel signal indicative of the backward movement (i.e., the signal for turning on the back lamps) is produced. The foregoing conventional vehicle navigation systems monitor the logic level of the backward travel signal (usually the logic level "H" in backward movement), and does not add to the travel distance of the system (travel distance for forwarding) the travel distance obtained during the logic level of "H". In contrast, some automobiles are designed to generate the backward travel signal of "L" when they move backward. If trying to install the foregoing conventional navigation systems into both the two types of automobiles, there arises a drawback that a travel distance calculated in backward movement is automatically added to the travel distance which had been calculated in forward travel, because the systems misinterpret the backward travel signal of "L" as being the signal in forward movement. This also leads to the third drawback that is apt to increase errors in calculated travel distances.

Further, there is a fourth drawback relating to noise filters. Conventional vehicle navigation systems have an LPF (Low Pass Filter) for removing noise in a radio frequency band of the above-said pulse signal. However, different types of automobiles may produce various kinds of pulse signals different in the number of pulses generated per rotation of wheel shafts. For example, when the frequency band of an LPF is set to well be applied to automobiles where a higher number of pulses per rotation of wheel shafts is generated, the LPF cannot practically remove noise existing in a radio frequency band of a pulse signal generated by an automobile whose number of pulses per rotation of wheel shafts is lower. In consequence, noise would be included into the pulse signals of automobiles which generate lower numbers of pulses of in pulse signals, thereby providing the fourth drawback that reluctantly raises errors in travel distances calculated based on pulse signals into which noise is included largely.

SUMMARY OF THE INVENTION

The object of the present invention is to provide methods of and systems for deriving travel distances, which are capable of accurately deriving the travel distances even if the travel condition of the vehicle changes and/or the system is installed various types of vehicles.

According to one aspect of the first mode of the present invention, there is provided a method of deriving a travel distance of an object which travels, including the steps of: calculating a travel velocity of the object which produces a pulse signal in response to a travel of the object on the basis of a number of pulses of the pulse signal per unit time; calculating a plurality of unit travel distances corresponding to a plurality of travel states of the object at every travel state, the plurality of travel states being different from each other, the unit travel distance being a travel distance per pulse calculated by dividing the calculated travel velocity by the number of the pulses of the pulse signal per unit time; memorizing individually the plurality of calculated unit travel distances; selecting from the plurality of memorized unit travel distances the unit travel distance corresponding to the travel state of the object which is under travel; and deriving the travel distance of the object on the basis of the selected unit travel distance and the pulse signal.

According to another aspect of the first mode of the present invention, there is provided a system for deriving a travel distance of an object which travels, including: a velocity calculating unit for calculating a travel velocity of the object which produces a pulse signal in response to a travel of the object on the basis of a number of pulses of the pulse signal per unit time; a calculating unit for calculating a plurality of unit travel distances corresponding to a plurality of travel states of the object at every travel state, the plurality of travel states being different from each other, the unit travel distance being a travel distance per pulse calculated by dividing the calculated travel velocity by the number of the pulses of the pulse signal per unit time; a memorizing unit for memorizing individually the plurality of calculated unit travel distances; a selecting unit for selecting from the plurality of memorized unit travel distances the unit travel distance corresponding to the travel state of the object which is under travel; and a deriving unit for deriving the travel distance of the object on the basis of the selected unit travel distance and the pulse signal.

Accordingly, a plurality of unit travel distances corresponding to a plurality of travel states are individually memorized, a unit travel distance corresponding to a travel state is selected when an object travels, and a travel distance is selected in conformity with the selected unit travel distance and the number of pulses. This enables an accurate calculation of travel distances preferably adaptable to various travel states.

According to one aspect of the second mode of the present invention, there is provided a method of deriving a travel distance of an object which travels, including the steps of: calculating a travel velocity of the object which produces a pulse signal in response to a travel of the object on the basis of a number of pulses of the pulse signal per unit time; calculating at every predetermined timing a unit travel distance being a travel distance per pulse calculated by dividing the calculated travel velocity by the number of the pulses of the pulse signal; calculating an error between the current unit travel distance calculated this time and the last unit travel distance calculated last time; updating the last unit travel distance by replacing the last unit travel distance with the current unit travel distance, if the calculated error is less than a preset specified threshold; and deriving the travel distance of the object based on the updated last unit travel distance and the number of the pulses of the pulse signal.

According to another aspect of the second mode of the present invention, there is provided a system for deriving a travel distance of an object which travels, including: a velocity calculating unit for calculating a travel velocity of the object which produces a pulse signal in response to a travel of the object on the basis of a number of pulses of the pulse signal per unit time; a distance calculating unit for calculating at every predetermined timing a unit travel distance being a travel distance per pulse calculated by dividing the calculated travel velocity by the number of the pulses of the pulse signal; an error calculating unit for calculating an error between the current unit travel distance calculated this time and the last unit travel distance calculated last time; a updating unit for updating the last unit travel distance by replacing the last unit travel distance with the current unit travel distance, if the calculated error is less than a preset specified threshold; and a deriving unit for deriving the travel distance of the object based on the updated last unit travel distance and the number of the pulses of the pulse signal.

Accordingly, only when the error between the unit travel distances of this time and that of last time lies within a specified threshold, the unit travel distance is updated, and the travel distance is derived based on the updated unit travel distance and the number of pulses. Namely, in cases where there is large errors due to, for example, changes in travel states of an object which a user is now operating, the unit travel distance will not be updated. This can avoid large errors in unit travel distances, and avoid large errors from being influenced on calculation of travel distances. This also leads to an accurate calculation of travel distances.

According to one aspect of the third mode of the present invention, there is provided a method of deriving a travel distance of an object which travels, including the steps of: measuring a forward travel velocity of the object under forward travel; discriminating whether or not the measured forward travel velocity is greater than a preset specified velocity; detecting a level of a backward travel signal indicative of a state of the object under backward travel, when the measured forward travel velocity is greater than the specified velocity; and calculating the travel distance of the object independently of the travel distance of the object in a case that a level of the backward travel signal differs from the detected level.

According to another aspect of the third mode of the present invention, there is provided a system for deriving a travel distance of an object which travels, including: a measuring unit for measuring a forward travel velocity of the object under forward travel; a discriminating unit for discriminating whether or not the measured forward travel velocity is greater than a preset specified velocity; a detecting unit for detecting a level of a backward travel signal indicative of a state of the object under backward travel, when the measured forward travel velocity is greater than the specified velocity; and a calculating unit for calculating the travel distance of the object independently of the travel distance of the object in a case that a level of the backward travel signal differs from the detected level.

Accordingly, the logic levels of the backward travel signal have been pre-detected under a state that an object runs forward at a predetermined speed or more. And actual calculation of travel distances is carried out in such a manner that the travel distances obtained when the logic level of the backward travel signal differs from the logic level acquired under the above forward travel (i.e., the travel distances obtained when the object moves backward) are not taken into calculation. This can avoid the travel distance under backward travel from included into the travel distance under forward travel, enabling calculation of the accurate travel distances of the object.

According to one aspect of the fourth mode of the present invention, there is provided a method of deriving a travel distance of an object which travels, including the steps of: calculating a travel velocity of the object which produces a pulse signal in response to travel of the object on the basis of a number of pulses of the pulse signal per unit time; calculating a unit travel distance being a travel distance per pulse calculated by dividing the calculated travel velocity by the number of the pulses of the pulse signal; selecting, from a plurality of filter units, such as LPFs (Low Pass Filters), having frequency bands different from each other in order to remove noise from the pulse signal, a corresponding one of the plurality of filter units having one of the frequency bands corresponding to the calculated unit travel distance; and deriving the travel distance of the object based on not only the noise-removed pulse signal by the selected corresponding filter means but also the unit travel distance.

According to another aspect of the fourth mode of the present invention, there is provided a system for deriving a travel distance of an object which travels, including: a velocity calculating unit for calculating a travel velocity of the object which produces a pulse signal in response to travel of the object on the basis of a number of pulses of the pulse signal per unit time; a distance calculating unit for calculating a unit travel distance being a travel distance per pulse calculated by dividing the calculated travel velocity by the number of the pulses of the pulse signal; a plurality of filter units having frequency bands different from each other in order to remove noise from the pulse signal; a selecting unit for selecting, from the plurality of filter units, a corresponding one of the plurality of filter units having one of the frequency bands corresponding to the calculated unit travel distance; and a deriving unit for deriving the travel distance of the object based on not only the noise-removed pulse signal by the selected corresponding filter means but also the unit travel distance.

Accordingly, every calculation of unit travel distance, a necessary filter unit is selected to remove noise from the pulse signal, and each travel distance is calculated on the basis of the noise-removed pulse signal and the unit travel distances. Thus, the influence from the noise of the pulse signal is effectively eliminated in deriving the travel distance.

The nature, utility, and further features of this invention will be more clearly apparent from the following detailed description with respect to preferred embodiment of the invention when read in conjunction with the accompanying drawings briefly described below.

DESCRIPTION OF THE PREFERRED EMBODIMENTS

Preferred embodiments of the present invention will be described below with reference to the accompanying drawings. In each embodiment, the present invention is applied to a vehicle navigation system installed in automobiles and the like.

[I] Configuration of System

Figure 1:
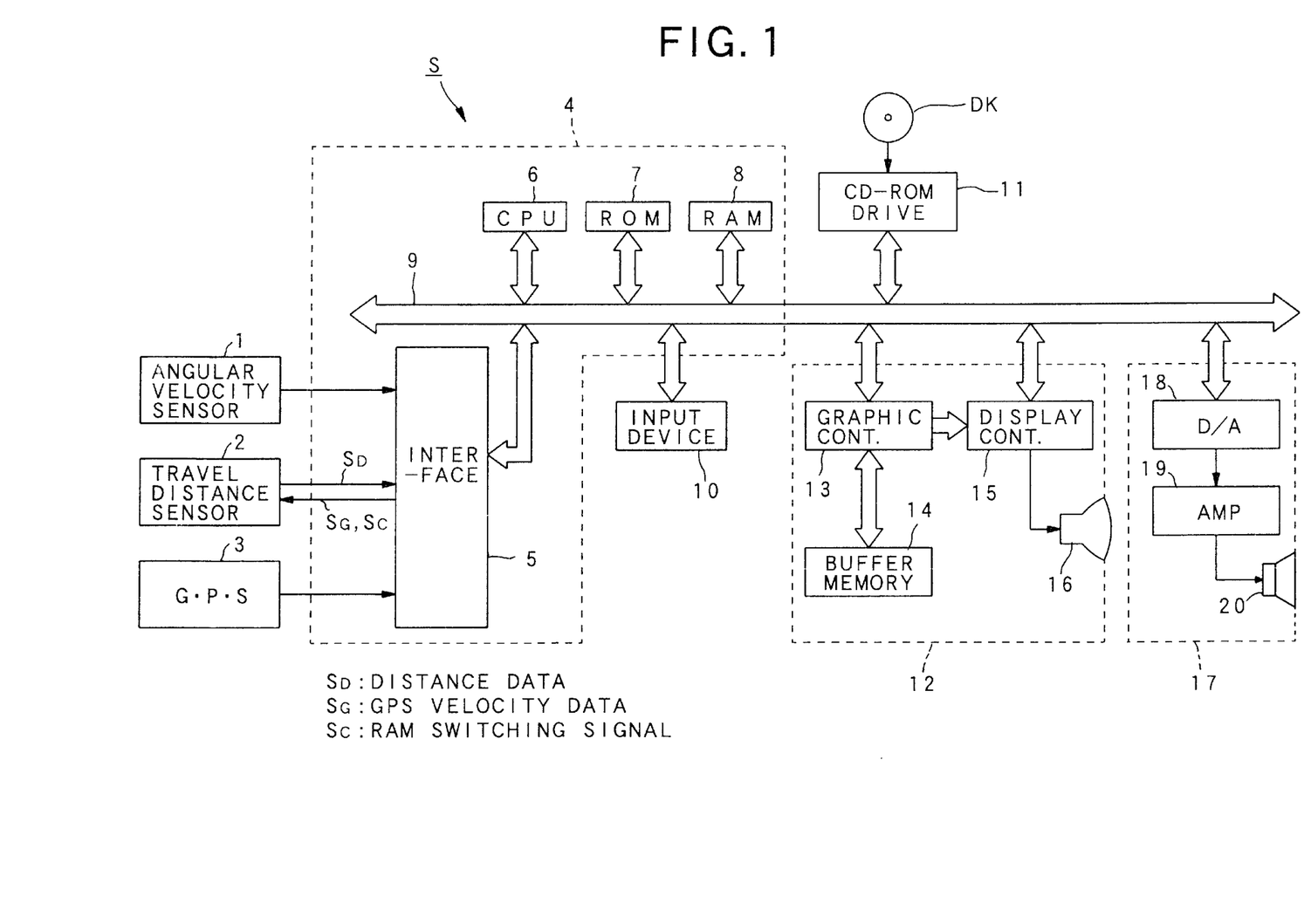
FIG. 1 is a block diagram illustrating an overall configuration of a vehicle navigation system according to an embodiment of the present invention.

FIG. 1 is a block diagram illustrating the construction of a vehicle navigation system according to an embodiment of the present invention. A vehicle navigation system S includes an angular velocity sensor 1, a travel distance sensor 2, a GPS receiver 3, a system controller 4, an input device 10, a CD-ROM (Compact Disk Read Only Memory) drive 11, a display unit 12, and a sound reproduction unit 17. The angular velocity sensor 1 detects an angular velocity of the vehicle especially when a vehicle changes its travel direction, and outputs angular velocity data and relative azimuth data. The travel distance sensor 2 calculates a unit travel distance by counting the number of pulses of a pulse signal provided associated with the rotation of wheels, and outputs the unit travel distance as distance data $S_D$ to later-described CPU 6 through later-described bus line 9. The GPS receiver 3 receives electric waves transmitted from GPS satellites in order to provide GPS position-measuring data as well as absolute azimuth data indicative of the direction of travel of vehicle. The system controller 4 is in charge of controlling the whole navigation system on the basis of relative azimuth data, angular velocity data, travel distance data, GPS position-measuring data, and absolute azimuth data. Still, the input device 10, which is a remote control pad, for instance, permits users to input various necessary data. Under control of the system controller 4, the CD-ROM drive 11 reads out from CD-ROM disc DK a variety of data concerning road data including the number of traffic lanes and the width of roads, and output those data. Also under control of the system controller 4, the display unit 12 visualizes various display data that has been given. Also under control of the system controller 4, the sound reproduction unit 17 reproduces various sound data that has been given, and also generates corresponding vocal messages.

The system controller 4 is provided with an interface 5, a CPU 6, a ROM (Read Only Memory) 7, and a RAM (Random Access Memory) 8. A bus line 9 connects the input device 10, CD-ROM drive 11, display unit 12, and sound reproduction unit 17 with each other. The interface 5 is placed to perform an interface operation with external sensors such as the GPS receiver 3. The CPU 6 is placed for controlling the whole system controller 4. Furthermore, the ROM 7 stores data including control program data for controlling the system controller 4. The RAM 8 has a non-volatile memory not shown and stores in readable situation various data including route data preset by users through the input device 10.

The display unit 12 is provided with a graphic controller 13, a buffer memory 14, a display controller 15, and a display 16. Among them, the graphic controller 13 controls the whole display unit 12 based on control data supplied from the CPU 6 via the bus line 9. The buffer memory 14 is comprised of memory such as VRAM (Video RAM) which temporarily stores video information to be displayed in real time. Based on video data provided from the graphic controller 13, the display controller 15 controls the operation of the display 16, which is formed by a liquid-crystal or CRT (Cathode Ray Tube) display.

The sound reproduction unit 17 has a D/A converter 18, an amplifier 19, and a speaker 20. The D/A converter 18 performs digital-to-analog conversion on digital audio data supplied from the CD-ROM drive 11 or RAM 18 via the bus line 9. The amplifier 19 amplifies an analog audio signal outputted from the D/A converter 18. The speaker 20 converts the amplified audio analog signal into vocal messages.

In the above configuration, distance data SD is provided from the travel distance sensor 2 to the CPU 6. In contrast, provided from the CPU 6 to the travel distance sensor 2 are GPS velocity data $S_G$ which are calculated by the CPU 6 on the basis of GPS position-measuring data obtained by the GPS sensor 3, and a RAM-switching signal $S_C$ for switching over from one to another among a plurality of output signals of a plurality of RAMs placed in the later-explained travel distance sensor 2 based on switching information provided from the input device 10.

Next, the configuration of the travel distance sensor 2 according to the present invention will now be explained with reference to FIG. 2.

Figure 2:
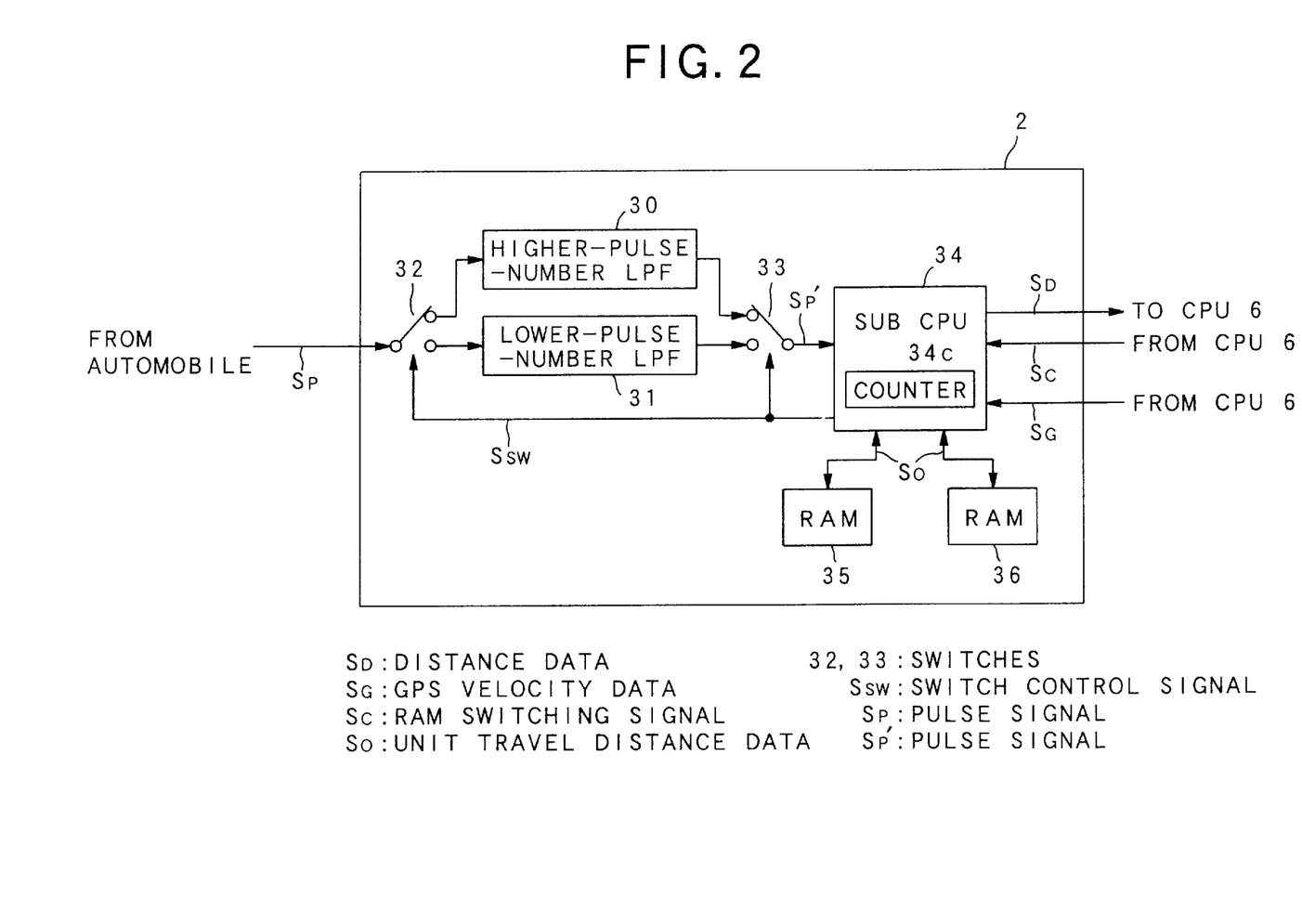
FIG. 2 is a block diagram illustrating a detailed configuration of a travel distance sensor in the embodiment.

As shown in FIG. 2, the travel distance sensor 2 is provided with a higher-pulse-number LPF 30, a lower-pulse-number LPF 31, switches 32 and 33, a sub CPU 34, and RAMs 35 and 36. The LPFs 30 and 31 are both placed to remove noise from the pulse signal $S_P$ provided in response to the rotation of wheel shafts of an automobile in which the vehicle navigation system S is installed. The higher-pulse-number LPF 30 removes noise in a radio frequency band of the pulse signal $S_P$ in cases where the number of pulses of the pulse signal $S_P$ per rotation of the wheel shaft is greater than a certain value, while the lower-pulse-number LPF 31 removes noises in a radio frequency band of the pulse signal $S_P$ in cases where the number of pulses of the pulse signal $S_P$ per rotation of the wheel shaft is lower than the above certain value. Both the switches 32 and 33 switch from one to another between the higher- and lower-pulse-number LPF 30 and 31 in response to a switch control signal Ssw supplied from the sub CPU 34. The sub CPU 34 not only controls the whole travel distance sensor 2 but also provides the CPU 6 with the distance data SD through processing on a later-described flowchart requiring handling of the GPS velocity data $S_G$ and the RAM switching signal $S_C$ both of which are supplied from the CPU 6. The RAM 35 is provided to temporarily store and output the unit travel distance for summer tires. Further, the RAM 36 is provided to temporarily store and output the unit travel distance for winter tires. Additionally, the sub CPU 34 incorporates therein a counter 34c for counting the update number of the unit travel distance.

[II] Operation

The operation of the vehicle navigation system S will be described. Operation represented by each of the following flowcharts, mainly executed by the sub CPU 34 and CPU 6, are executed as a part of a main navigation program to control the entire vehicle navigation system S. Accordingly, operation of the flowcharts of the embodiment is continuously executed during the main navigation program. Programs corresponding to flowcharts in the following embodiment have been prestored as control programs in the ROM 7 or in the CD-ROM DK to be transferred to the RAM 8 so that the CPU 34 reads them out and executes them as the occasion demand. The CD-ROM DK is a program storage device which tangibly embodies the programs executed by the sub, CPU 34, that are shown in FIGS. 3, 6, 7A and 7B.

Figure 3:
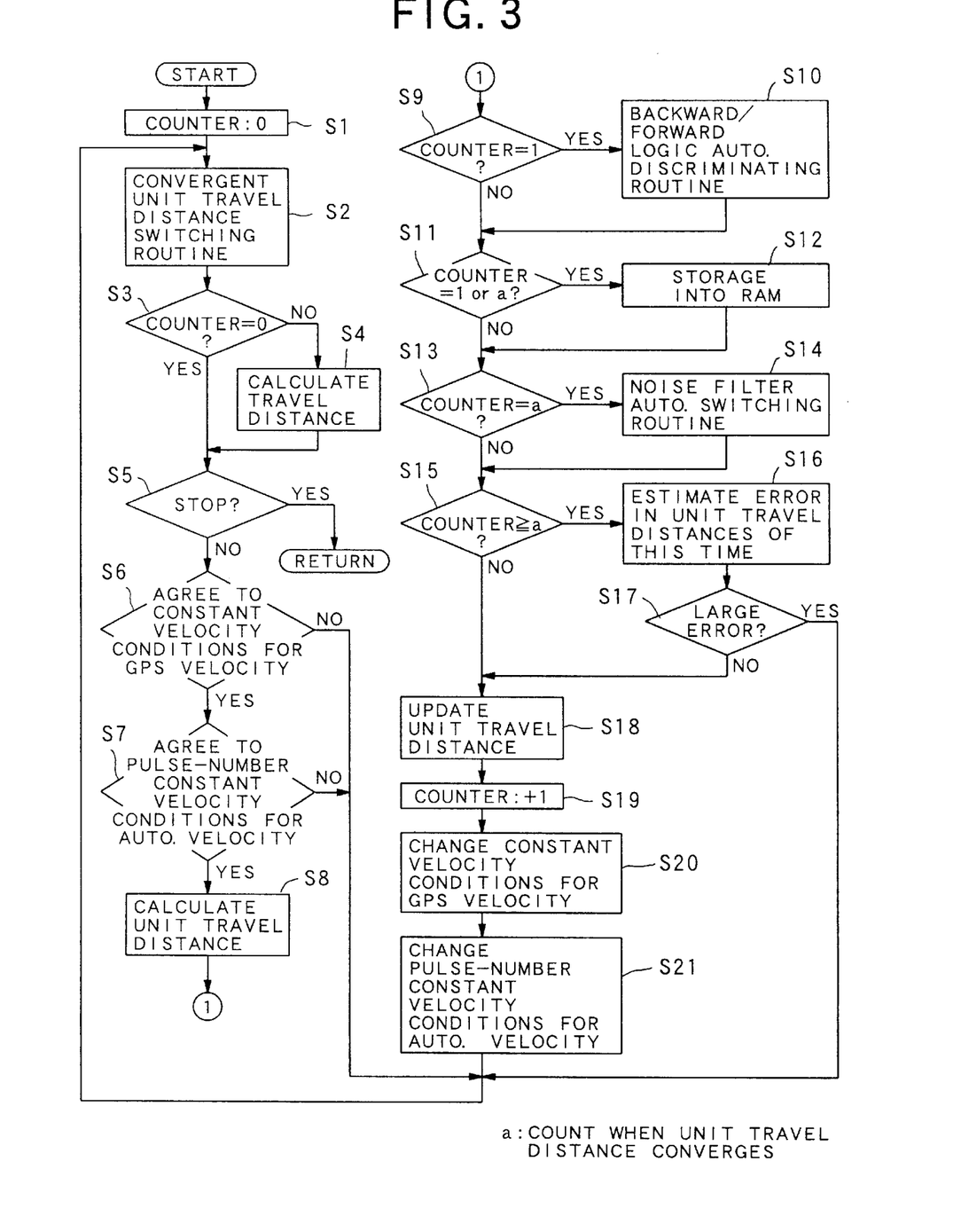
FIG. 3 is a flowchart illustrating the processing of calculating travel distances in the embodiment.

In addition, before the processing of calculating travel distances according to FIG. 3, preset through the input device 10 is information representing that an automobile in which the vehicle navigation system S is installed is equipped with summer tires or winter tires, which is memorized in a RAM placed in the sub CPU 34 (not shown).

First, the entire processing of calculating the travel distance will be described using the flowchart shown in FIG. 3. This processing of FIG. 3 is regularly executed at a rate of once per approximately one second, for example. As a result, the travel distance is calculated and outputted as distance data $S_D$.

As shown in FIG. 3, in processing of calculating travel distances, when the ignition switch of the automobile is turned on, the counter 34c is initialized; specifically, its count is set to "0" (step S1). After the initialization at step S1, the processing proceeds to a convergent unit travel distance switching routine (step S2). The switching routine at step S2 is made up of a series of steps to selectively switch, responsively to a RAM switching signal $S_C$ supplied from the CPU 6, between unit travel distances corresponding to the summer tires and being stored in the RAM 35 in a condition that they are precalculated and converged in a region of target values, and unit travel distances corresponding to the winter tires and being stored in the RAM 36 in a condition that they are precalculated and converged in a region of target values. Detailed processing in the unit travel distance switching routine S2 and convergence operation of the unit travel distances will be described later.

After the completion of the unit travel distance switching routine at step S2, it is discriminated whether the count of the counter 34c is "0" or not (step S3). When the count is not "0" (step S3, NO), a travel distance at that time is calculated by multiplyling the value of the newest unit travel distance by the number of pulses of the pulse signal $S_P$ at the measurement time (step S4). The calculated data is supplied, as distance data SD, to the CPU 6 via the bus line 9. The processing then proceeds to step S5. At step S4, in cases where a logical level of the backward travel signal becomes a level which forward/backward travel logic automatic discriminating routine in step S10 described later judges that the automobile is under backward movement, the travel distances calculated in such situation are excluded from accumulation.

At processing of step S3, when the count of the counter 34c is "0" (step S3, YES), based on the presence or the absence of the pulse signal $S_P$ or based on the GPS velocity supplied by the CPU 6, it is discriminated whether the automobile has been stopped (step S5). If the automobile has not been stopped (step S5, NO), the process of step S6 is performed. On the other hand, if the automobile has been stopped (step S5, YES), the processing returns to the main navigation program.

In the discrimination of step S5, if it is found that the automobile is traveling, the processing goes to step S6 where on the bases of the GPS velocity data $S_G$ supplied by the CPU 6, it is discriminated that a velocity calculated using position-measuring electric waves (hereinafter, referred to as "GPS velocity") is within a range of velocities which can be regarded as a predetermined constant velocity. Specifically, four consecutive GPS velocities are held by a buffer (not shown) in the sub CPU 34, velocity differences for each of all the possible pairs of two GPS velocities of the four GPS velocities are calculated, and it is discriminated whether or not all the differences are within a range of velocity which can be regarded as a predetermined constant velocity. The above range of velocity is set according to the count n of the counter 34c (i.e., the number of calculation of the unit travel distance), for example, as shown in the right-hand column in FIG. 5. As seen, the accuracy in unit travel distances is increased as the number increased, and the range of the velocity deemed as a constant velocity narrows.

If the GPS velocities are not within the velocity range regarded as a constant velocity (step S6, NO), the process returns to the process of step S2 without updating the unit travel distance, while if the GPS velocity is within the above velocity range (step S6, YES), it is further discriminated whether or not the number of pulses per unit time (for example, one second) of the pulse signal $S_P$ is within a number of pulses which can be regarded as a predetermined constant velocity (step S7). Specifically, in the similar way to the case of the GPS velocity in step S6, the number of four consecutive pulses per unit time are held by the buffer in the sub CPU 34, differences in pulse number for each of all the possible pairs of two pulse numbers per unit time selected from the four pulse numbers are calculated, and it is discriminated whether or not all the differences are within a range of pulse numbers which can be regarded as a predetermined constant velocity. The above range of pulse numbers is set according to the count n of the counter 34c, for example, as shown in the left-side column in FIG. 5. As seen, the accuracy in unit travel distances increases as the increased number, and the range of the pulse numbers become smaller.

Figure 4:
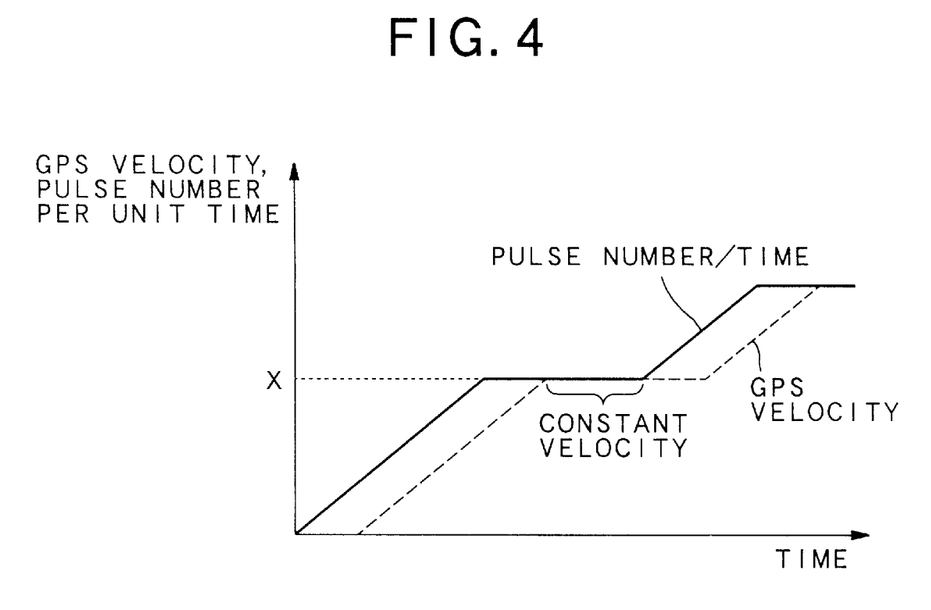
FIG. 4 is a diagram illustrating constant velocity conditions.

If the pulse numbers are not within the pulse number range regarded as a constant velocity (step S7, NO), the unit travel distance is not updated and the process returns to step S2. In contrast, if the pulse numbers are within the above pulse number range (step S7, YES), this shows that both the travel velocities in the stand-alone position-measuring system, which has calculated based on the pulse signal $S_P$, and the GPS velocity are both constant. This constant-velocity state corresponds to the constant velocity portion graphically represented in FIG. 4. In the constant velocity portion, it is considered that there is no influence by the time-lag between the calculation timing of the GPS velocities and the calculation timing of the travel velocities in the stand-alone position-measuring system.

When the conditions set at steps S6 and S7 are satisfied, the sub CPU 34 divides the GPS velocity by the pulse number per unit time (1 sec.) of the pulse signal $S_P$, thereby calculating a unit travel distance (step S8).

Then, it is discriminated whether the count of the counter 34C is "1" or not (step S9). If the discrimination result is "1" (step S9, YES), it is considered that the automobile is in an extremely early travel stage, such as just after the departure. In this case, the forward/backward travel logic automatic discriminating routine described later is executed (step S10), and then the processing goes to step S11. The forward/backward travel logic automatic discriminating routine at step S10 is used for preventing travel distances under the automobile's backward travel from being accumulated in the integrated travel distance to be obtained under the automobile's forward travel. To accomplish this, the logic levels of the backward signal under the forward travel are memorized, and the backward travel signal is monitored during the travel distance calculation shown in FIG. 3. At the step (step S4) for calculating the travel distances, when a logic level other than the logic level of the backward travel signal acquired under the forward travel is found, the automobile is regarded to be in the backward movement. In this case, the calculated travel distance is inhibited to be added to its integrated value. The above discriminating routine is executed when the count n is "1", because it is required to recognize the logic levels under the backward travel at as early stage of the travel as possible in calculating the travel distances. The above detailed discriminating routine will be given later.

In the discrimination at step S9, if the count n is not "1" (step S9, NO), the processing proceeds to step S11 where it is discriminated whether the count n is "1" or "a". The count "a" is a value of update number with which an error in unit travel distances may be approximately zero or about. (In other words, the count "a" is interpreted as the update number of unit travel distances with which it can be determined that the unit travel distance fully converges.) The practical value of the count "a" is, for example, "150".

In the discrimination of step S11, if the count n is "1" or "a" (step S11, YES), the process of step S12 is executed in which the newest unit travel distance is stored into the RAM 35 or RAM 36, which is followed by step S13. In the process of step S12, in the case that an automobile undergoing the processing of the travel distance calculation shown in FIG. 3 is equipped with summer tires and information indicative of this equipment is preset into the system, the unit travel distance updated at step S4 is memorized into the RAM 35, while in the case that the automobile is equipped with winter tires and information indicative of this equipment is preset into the system, the updated unit travel distance is memorized into the RAM 36. The reason that the updated travel distance is stored into the RAM 35 or RAM 36 in case of the count n being "1" is that for the later-counted counts n (counts n more than 1), calculating the travel distances based on the unit travel distance initially calculated and stored is necessary. The reason that the storage into the RAM 35 or RAM 36 is carried out in case of the count n being "a" is resulted from a situation that the storage should be done after the accuracy in the unit travel distances has been sufficiently increased.

In the discrimination of step S11, if the count n is not "1" or "a" (step S11, NO), the process of step S13 is done where it is discriminated if the count n is "a" or not. If the count n is "a" (step S13, YES), the processing proceeds to step S14 where executed is a noise filter automatic switching routine described later. After this, the processing goes to step S15. The noise filter automatic switching routine at step S14 is a process used for determining the quantity of number of pulses per rotation of wheel shafts on the basis of the newest unit travel distance and switching between the higher-pulse-number LPF 30 and the lower-pulse-number LPF 31. This switching routine is carried out in case of the count n being "a", because the process of step S14 should be done when it is determined that accuracy in the unit travel distances has been increased enough to alternatively select the higher-pulse-number LPF 30 or lower-pulse-number LPF 31 in accordance with a frequency difference between both the filters 30 and 31. This switching routine will be detailed later.

If the count n is not "a" in the discrimination of step S13 (step S13, NO), it is then discriminated whether or not the count n is "a" or more at step S15. If the count n is "a" or more (step S15, YES), the processes of steps S16 and S17 are performed as a unit travel distance error automatic discriminating routine. The purpose of this discriminating routine at steps S16 and S17 is to prevent the accuracy in the unit travel distances from being lowered even when particular cases such as application of chains to wheels of the automobile or a slip of an automobile occurred. If the foregoing update of the unit travel distances is kept going without any measure when such particular cases occurred, temporary changes in the unit travel distances due to the chain application, slip, or the like, is reflected as the influence on the update of the unit travel distance, resulting in the lowered accuracy in the unit travel distances. Further, the purpose of executing the unit travel distance error automatic discriminating routine in case of the count n being "a" or more is to discriminate the error when it is considered that the accuracy in the unit travel distances has been increased enough to perform the error discrimination.

To be more specific, in the unit travel distance error automatic discriminating routine, judged at step S16 is an error between the unit travel distance corresponding to the count n of this time and the unit travel distance corresponding to the count n-1 of last time (n: count of this time, i.e., current count). Then, the quantity of the error is estimated (step S17). When the error is large (practically, for example, the error is over 3%)(step S17, YES), it is considered that particular cases, such as application of tire chains or slip, take place. For such cases, the update of the unit travel distance is inhibited and the processing returns to step S2.

In contrast, when the error is not large (practically, for example, the error is 3% or less)(step S17, NO), the processing goes to step S18 to update the value of the unit travel distance.

Figure 5:
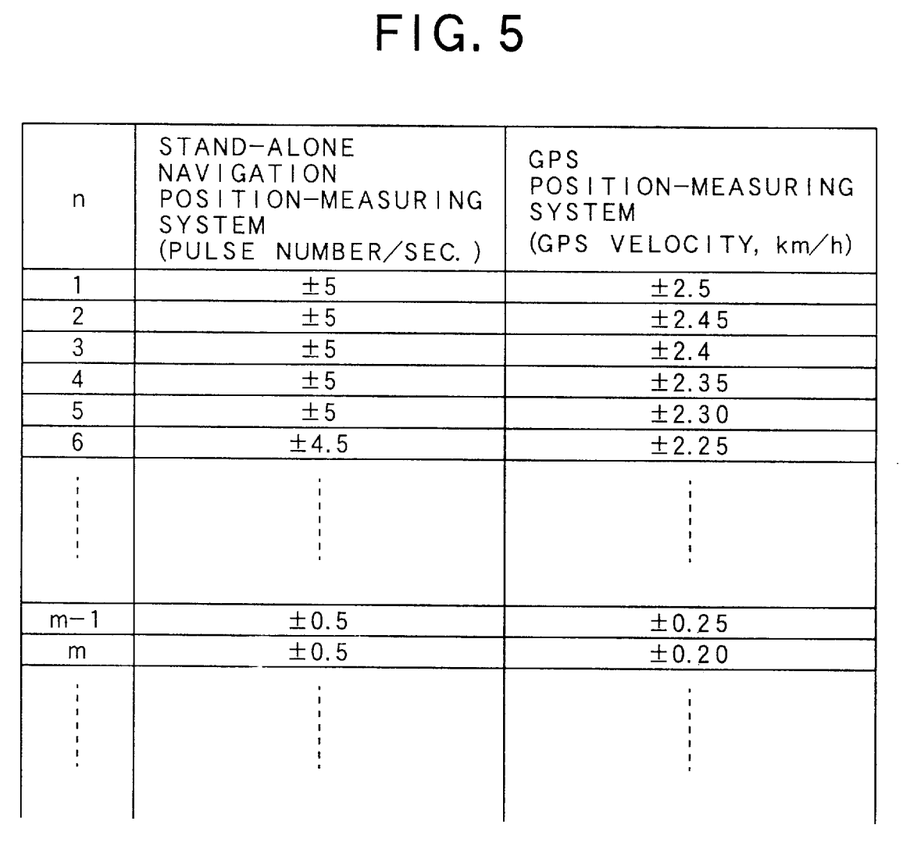
FIG. 5 is a diagram illustrating a relation between tolerances for the constant velocity conditions and counts of a counter.

On the other hand, the count n is less than "a" in the discrimination of step S15, the process of step S18 is executed, where the unit travel distance stored in the buffer of the sub CPU. 34 is updated with the value calculated at step S8. After this update, the counter 34 increments its count by "1" (step S19). In order to improve the accuracy of the unit travel distance calculated next time at steps S6 to S8, in relation to the increase of the count of the counter 34c, conditions used in calculating the unit travel distance next time (steps S6 to S8) is changed (step S20). More particularly, the range of velocity which may be regarded as a constant velocity, which is a constant velocity condition (step S6) for the GPS velocity, is narrowed by a predetermined quantity (for example, 0.1 km/h, See. FIG. 5).

Furthermore, the range of pulse numbers which may be regarded as a constant velocity, which is a constant velocity condition (step S7) for the pulse signal $S_P$, is also narrowed by a predetermined quantity (for example, decreased by one pulse, See. FIG. 5)(step S21).

FIG. 5 shows variations in the constant velocity conditions for both the GPS velocities and the pulse signal $S_P$, the conditions being gradually made strict as the count of the counter 34c increase, by the processing of step S20 and S21. The reason that both the constant velocity conditions are gradually made strict by the steps S20 and S21 is to reduce a time period to obtain the unit travel distance at the early stage. Namely, if the condition is made strict even in the initial stage of the processing, the calculation of the distance data SD takes a comparatively long period in which the distance data SD is not available.

After both the two constant velocity conditions have been reset, the processing returns to step S2.

Next, the unit travel distance switching routine, carried out at step S2, will now be explained in detail with reference to a flowchart shown in FIG. 6.

Figure 6:
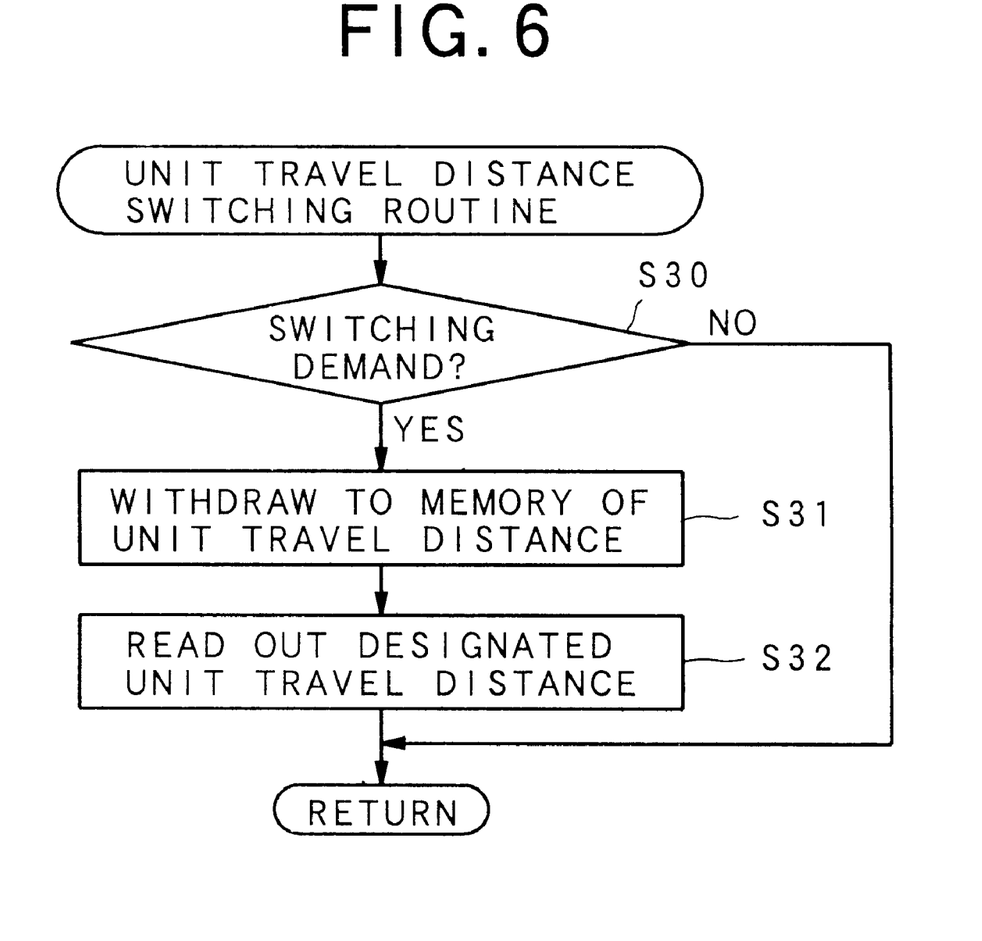
FIG. 6 is a flowchart illustrating details of a unit travel distance switching routine.

As shown in FIG. 6, in this routine, it is first discriminated whether or not a command for switching the unit travel distance is requested from the input device 10 (step S30). A user inputs the above switching command through the input device 10 when he exchanged summer tires to winter tires and vice versa. When the switching command being inputted, the CPU 6 supplies the RAM switching signal $S_C$ to the sub CPU 34. When the switching command is recognized through the RAM switching signal $S_C$ from the CPU 6 (step S30, YES), the sub CPU 34 outputs and memorizes into the corresponding RAM 35 or RAM 36 the unit travel distance data So indicative of the current updated unit travel distance (step S31). After this, the sub CPU 34 reads out, from the corresponding RAM 35 or RAM 36, the unit travel distance data So indicative of the current unit travel distance corresponding to summer tires or winter tires designated by the exchanging command (step S32). After this read-out, the processing returns to the steps in FIG. 3.

On the other hand, when the unit travel distance switching demand is not requested in the process of step S30 (step S30, NO), the processing returns to the step in FIG. 3 without switching the unit travel distance.

In an very early stage at which the unit travel distance data So indicative of a unit travel distance have still not been stored in either one of the RAM 35 or RAM 36, the unit travel distance calculated with either of summer tires or winter tires is stored in both the RAM 35 and RAM 36. When tires other than the tires corresponding to the unit travel distances memorized are equipped to the automobile, the unit travel distance updated at that time is memorized into the RAM 35 or RAM 36 corresponding to the equipped tires.

Figure 7A:
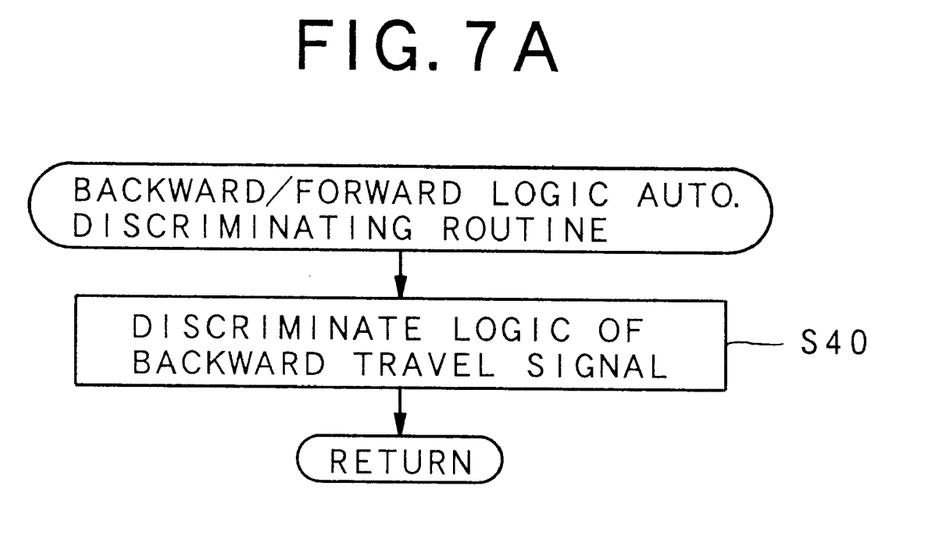
FIG. 7A is a flowchart illustrating details of a forward/backward automatic discriminating routine.

Next, the forward/backward travel logic automatic discriminating routine carried out at step S10 will now be explained with reference to a flowchart in FIG. 7A.

This discriminating routine is initiated by the determination of the count n="1" (step S9, YES). As shown in FIG. 7A, in response to the initiation, it is discriminated that current logic levels of the backward travel signal is "H" or "L" (step S40). This discrimination result is memorized into the RAM in the sub CPU 34, and the processing returns to the process in FIG. 3. Since a series of process in FIG. 3 are normally performed under forward travel, a logic level of the backward travel signal which has been memorized in this discriminating routine corresponds to and expresses a logic level of the backward travel signal under forward travel. Accordingly, in calculation of the travel distance for the count n of "2" or more, when the logic level of the backward signal is not coincident with a logic level discriminated at step S40, the travel distance calculated under such situation is not added to the integration of all the travel distances. With the view of increasing accuracy in discriminating the logic levels of the backward travel signal in the discriminating routine, the value of a constant velocity (shown by "X" is FIG. 4) used for discrimination with the constant velocity conditions at steps S6 and S7 is set to a value actually impossible to exist under backward travel (for example, 30 km/h).

Figure 7B:
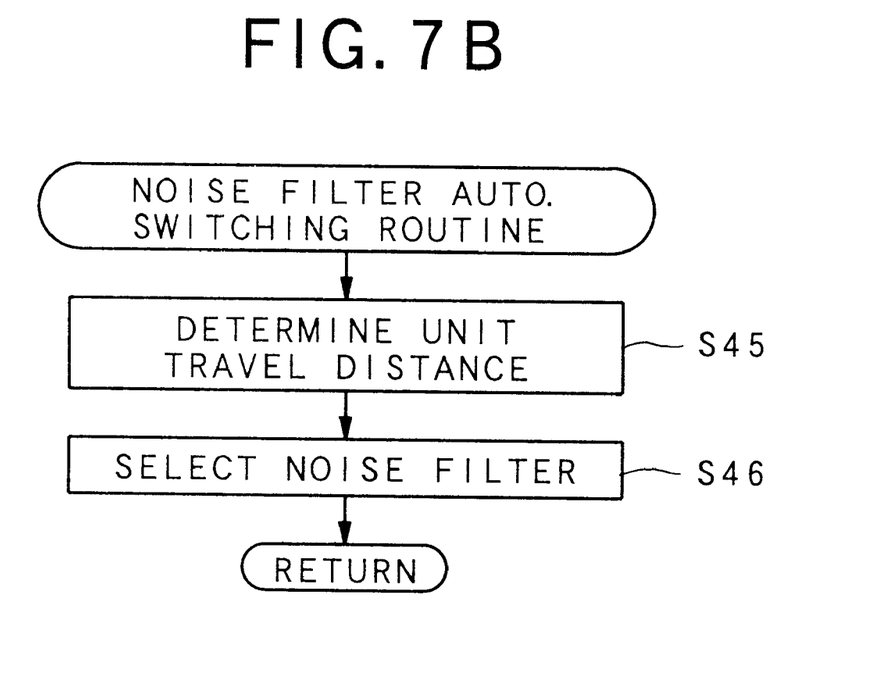
FIG. 7B is a flowchart illustrating a noise filter automatic switching routine.

Next, with reference to a flowchart of FIG. 7B, a noise filter automatic switching routine at step S14 will now be detailed.

This noise filter automatic switching routine starts responsively to the count n of "a" (step S13, YES). As represented in FIG. 7B, the quantity of the newest unit travel distance is judged (step S45), and according to the judged quantity, the higher-pulse-number LPF 30 and lower-pulse-number LPF 31 are alternatively selected by switching the switch 32 or 33 using the switch control signal Ssw supplied from the CPU 34 (step S46). As a result of this, the pulse signal $S_P$ is inputted into the higher-pulse-number LPF 30 or lower-pulse-number LPF 31 thus selected, and radio frequency noise is removed from the pulse signal $S_P$ to form a noise-removed signal $S_{P}'$ supplied from the switch 33 to the sub CPU 34. At step S46, a more practical example is such that the lower-pulse number LPF 31 is selected when the unit travel distance is over 30 cm (corresponding to less than approximately 5 pulses of the pulse number per rotation of wheel shafts).

As described above, the processing of calculating travel distances according to the embodiment of FIG. 3 permits the unit travel distance switching routine (step S2) to individually memorize a plurality of unit travel distances corresponding to a plurality of travel states or condition, to select a unit travel distance corresponding to a travel state when an automobile travels, and to derive a travel distance in conformity with the selected unit travel distance and the number of pulses. This enables the calculation of travel distances preferably adaptable to various travel states.

Further, in the unit travel distance error automatic discriminating routine (steps S16 and S17), only when the error between the unit travel distances associated with the count n of this time and the count n of last time lies within a specified threshold (for example, 3%), the unit travel distance is updated, and the travel distance is derived based on the updated unit travel distance and the number of pulses. Namely, in cases where there are large errors due to, for example, changes in travel states of the automobile which a driver is now operating (corresponding to step S17, YES), the unit travel distance will not be updated. This can avoid large errors in unit travel distances, and avoid the large errors from being reflected on calculation of travel distances.

Still further, for executing the forward/backward logic automatic discriminating routine (step S10), the logic levels of the backward travel signal have been pre-detected under a state that an automobile runs forward at a speed of 30 km/h or more. And actual calculation of travel distances is carried out in such a manner that the travel distances obtained when the logic level of the backward travel signal differs from the logic level acquired under the above forward travel are not taken into calculation. This can avoid the travel distance under backward travel from included into the travel distance under forward travel, thereby enabling calculation of the accurate automobile's travel distance.

Still further, by employing the noise filter automatic switching routine (step S14), the necessary higher-pulse-number LPF 30 or lower-pulse-number LPF 31 is alternatively selected to remove radio frequency (RF) noise from the pulse signal $S_P$, and the travel distance is calculated on the basis of the RF noise-removed pulse signal $S_P$ and the unit travel distances. Thus, the influence by the RF noise on the pulse signal $S_P$ is effectively eliminated in deriving the travel distance.

Although the foregoing embodiment uses only two kinds of LPFs, the present invention is not limited to this LPF configuration. For example, three or more LPFs, whose frequency bands passing the pulse signal $S_P$ are different from each other, can be arranged and switched in finer switching stages in answer to unit travel distances.

[III] Modifications

Various modifications of the vehicle navigation system S calculating travel distances according to the processing shown in FIGS. 3 to 7 will now be described.

A. Trip meter function

First, a trip meter function incorporated in the vehicle navigation system S using the travel distance calculated above will be described based on FIGS. 8A to 8C. Hereinafter, the "trip meter function" is to mean a function of calculating the total travel distance per day.

By the trip meter function, in principle, a travel distance is repeatedly calculated through the processing of FIGS. 3 to 7 over a time period between "on" and "off" of an ignition switch (practically, an ACC (accessory) switch) in one day limited by a clock function of the CPU 6, and the total travel distance in one day is obtained by integrating the repeatedly-calculated travel distances in that one day.

The trip meter function will now be described for a variety of travel states.

(i) Ignition switch is "on" at a date-setting time instant—(I) (refer to FIG. 8A):

In this case, a time period during which the ignition switch has been continuously "on" is considered to be one day, and the travel distances are continued to be calculated. And the total travel distance in the day is obtained by subtracting, from the total travel distance which has been integrated so far, the total travel distance obtained at a time instant when the ignition switch was turned "on" last time. The resultant total travel distance is then displayed.

Figure 8A:
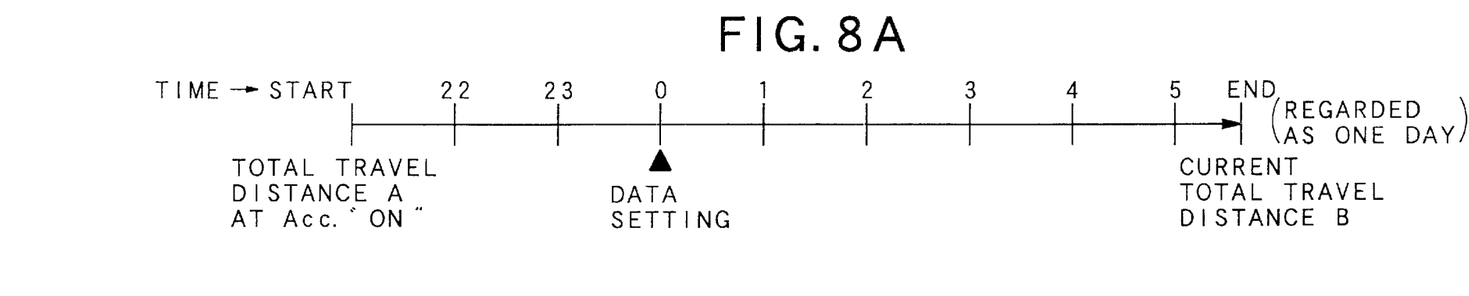
FIG. 8A is a pictorial diagram illustrating one example of trip meter functions according to a modification.

Thus, FIG. 8A can be summarized by a formula:

(Today's total travel distance)=(current total travel distance B)−(total travel distance A at ACC switch "on").

(ii) Ignition switch is "on" at a date-setting time instant—(II) (refer to FIG. 8B):

In this case, both two dates on which the ignition switch was turned "off" and again turned "on" are regarded as the same date, and the travel distance is obtained by integration. And the total travel distance is obtained by subtracting, from the total travel distance which has been integrated so far, the total travel distance obtained at a time a instant when the ignition switch was turned "on" last time. The resultant total travel distance is then displayed.

Figure 8B:
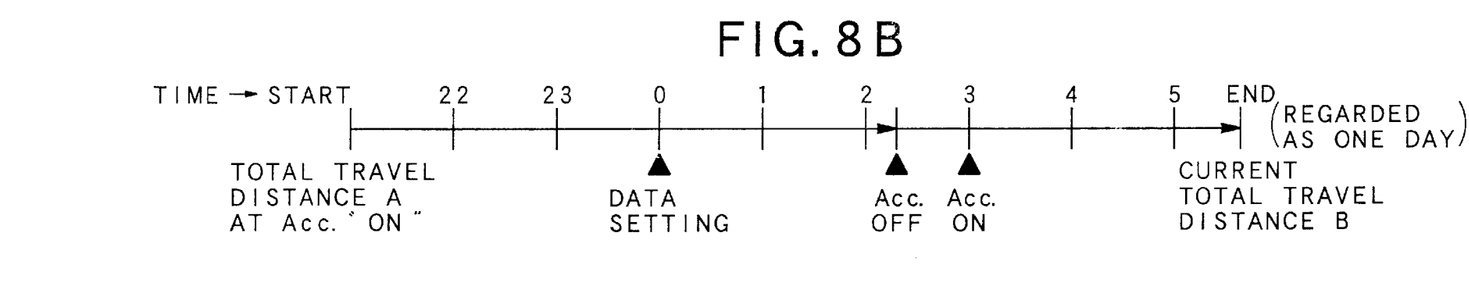
FIG. 8B is a pictorial diagram illustrating another example of trip meter functions according to the modification.

Thus, FIG. 8B can be summarized by a formula:

(Today's total travel distance)=(current total travel distance B)−(total travel distance A at ACC switch "on").

(iii) Ignition switch is "off" at a date-setting time instant (refer to FIG. 8C; this case is based on the foregoing principle):

In this case, the integration of the travel distances is completed when the ignition switch is turned "off", and the total travel distance in the day is once calculated. The integration of the total travel distances of next day is commenced at a time instant when the ignition switch is turned "on" next day.

Figure 8C:
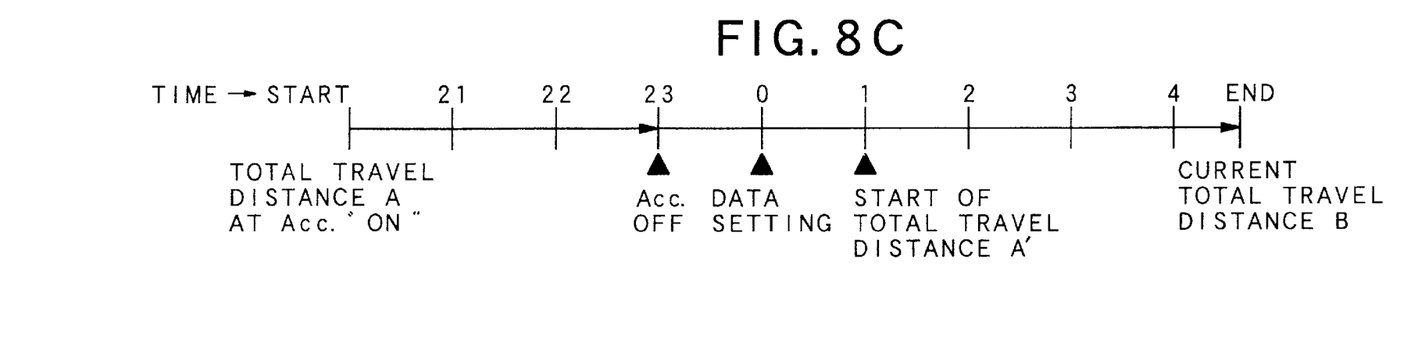
FIG. 8C is a pictorial diagram illustrating still another example of trip meter functions according to the modification.

Namely, the total travel distance in the second day in FIG. 8C is summarized as:

(Today's total travel distance)=(current total travel distance B)−(total travel distance S' at ACC switch "on").

B. Fuel consumption display function

A fuel consumption display function will now be described, which is added to the vehicle navigation system S acquiring the foregoing travel distances. Hereinafter, the "fuel consumption display function" means a function by which a value dividing the travel distance by a consumed total fuel amount (given through the input device 10) is displayed.

Under operation of this function, in principle, a total fuel consumption is obtained by dividing a current total travel distance by a consumed fuel amount. For fuel consumption at every fuel supply, if the latest fuel amount is inputted, the fuel consumption at every fuel supply is calculated by dividing by the supplied fuel amount the travel distance calculated after the last time of fuel supply, and is then displayed. At the supplied fuel amount in this calculation, the latest value among fuel amounts memorized at every time of fuel supply is used.

Another example is concerned with corrections of fuel amounts inputted at past fuel supplies. The fuel consumption at every fuel supply, in the same way as above, is calculated by dividing by the supplied fuel amount the travel distance calculated after the last time of fuel supply, and is then displayed. At this processing, however, the travel distance which had been calculated and memorized in the RAM 8 until the last time of fuel supply is used as the travel distance calculated after the last time of fuel supply, and the corrected fuel amount is used as the supplied fuel amount.

As mentioned above, operating the trip meter and fuel consumption functions with the travel distances calculated through the processing of FIGS. 3 to 7 enables more accurate calculation of the total travel distance per day and/or fuel consumption.

In addition to the above-mentioned modifications, there is provided another example, where an average speed per hour of an automobile is obtained by dividing the travel distance calculated for 30 minutes through the processing of FIGS. 3 to 7 by the interval (30 min.). It is understood that the travel distance calculated through the processing of FIGS. 3 to 7 can conveniently be processed into a wide variety of data necessary for driving automobiles.

Further, although the foregoing embodiment and modifications have been described about the vehicle navigation system S applied to automobiles, the vehicle navigation system of the present invention can also be applied motorcycles, tricycles, or the like.

What is claimed is:

1. A method of deriving a travel distance of an object which travels, comprising the steps of:

calculating a travel velocity of the object which produces a pulse signal in response to a travel of the object on the basis of a number of pulses of the pulse signal per unit time;

calculating a plurality of unit travel distances corresponding to a plurality of travel states of the object at every travel state, said plurality of travel states being different from each other, said unit travel distance being a travel distance per pulse calculated by dividing the calculated travel velocity by the number of the pulses of the pulse signal per unit time;

memorizing individually the plurality of calculated unit travel distances;

selecting from the plurality of memorized unit travel distances the unit travel distance corresponding to the travel state of the object which is under travel; and deriving the travel distance of the object on the basis of the selected unit travel distance and the pulse signal.

2. A method of deriving a travel distance of an object which travels, comprising the steps of:

calculating a travel velocity of the object which produces a pulse signal in response to a travel of the object on the basis of a number of pulses of the pulse signal per unit time;

calculating at every predetermined timing a unit travel distance being a travel distance per pulse calculated by dividing the calculated travel velocity by the number of the pulses of the pulse signal;

calculating an error between the current unit travel distance calculated this time and the last unit travel distance calculated last time;

updating the last unit travel distance by replacing the last unit travel distance with the current unit travel distance, if the calculated error is less than a preset specified threshold; and deriving the travel distance of the object based on the updated last unit travel distance and the number of the pulses of the pulse signal.

3. A method of deriving a travel distance of an object which travels, comprising the steps of:

measuring a forward travel velocity of the object under forward travel;

discriminating whether or not the measured forward travel velocity is greater than a preset specified velocity;

detecting a level of a backward travel signal indicative of a state of the object under backward travel, when the measured forward travel velocity is greater than the specified velocity; and calculating the travel distance of the object independently of the travel distance of the object in a case that a level of the backward travel signal differs from the detected level.

4. A method of deriving a travel distance of an object which travels, comprising the steps of:

calculating a travel velocity of the object which produces a pulse signal in response to a travel of the object on the basis of a number of pulses of the pulse signal per unit time;

calculating a unit travel distance being a travel distance per pulse calculated by dividing the calculated travel velocity by the number of the pulses of the pulse signal;

selecting, from a plurality of filter means having frequency bands different from each other in order to remove noise from the pulse signal, a corresponding one of the plurality of filter means having one of the frequency bands corresponding to the calculated unit travel distance; and deriving the travel distance of the object based on not only the noise-removed pulse signal by the selected corresponding filter means but also the unit travel distance.

5. A system for deriving a travel distance of an object which travels, comprising:

velocity calculating means for calculating a travel velocity of the object which produces a pulse signal in response to a travel of the object on the basis of a number of pulses of the pulse signal per unit time;

calculating means for calculating a plurality of unit travel distances corresponding to a plurality of travel states of the object at every travel state, said plurality of travel states being different from each other, said unit travel distance being a travel distance per pulse calculated by dividing the calculated travel velocity by the number of the pulses of the pulse signal per unit time;

memorizing means for memorizing individually the plurality of calculated unit travel distances;

selecting means for selecting from the plurality of memorized unit travel distances the unit travel distance corresponding to the travel state of the object which is under travel; and deriving means for deriving the travel distance of the object on the basis of the selected unit travel distance and the pulse signal.

6. A system for deriving a travel distance of an object which travels, comprising:

velocity calculating means for calculating a travel velocity of the object which produces a pulse signal in response to travel of the object on the basis of a number of pulses of the pulse signal per unit time;

distance calculating means for calculating at every predetermined timing a unit travel distance being a travel distance per pulse calculated by dividing the calculated travel velocity by the number of the pulses of the pulse signal;

error calculating means for calculating an error between the current unit travel distance calculated this time and the last unit travel distance calculated last time;

updating means for updating the last unit travel distance by replacing the last unit travel distance with the current unit travel distance, if the calculated error is less than a preset specified threshold; and deriving means for deriving the travel distance of the object based on the updated last unit travel distance and the number of the pulses of the pulse signal.

7. A system for deriving a travel distance of an object which travels, comprising:

measuring means for measuring a forward travel velocity of the object under forward travel;

discriminating means for discriminating whether or not the measured forward travel velocity is greater than a preset specified velocity;

detecting means for detecting a level of a backward travel signal indicative of a state of the object under backward travel, when the measured forward travel velocity is greater than the specified velocity; and calculating means for calculating the travel distance of the object independently of the travel distance of the object in a case that a level of the backward travel signal differs from the detected level.

8. A system for deriving a travel distance of an object which travels, comprising:

velocity calculating means for calculating a travel velocity of the object which produces a pulse signal in response to a travel of the object on the basis of a number of pulses of the pulse signal per unit time;

distance calculating means for calculating a unit travel distance being a travel distance per pulse calculated by dividing the calculated travel velocity by the number of the pulses of the pulse signal;

a plurality of filter means having frequency bands different from each other in order to remove noise from the pulse signal;

selecting means for selecting, from the plurality of filter means, a corresponding one of the plurality of filter means having one of the frequency bands corresponding to the calculated unit travel distance; and deriving means for deriving the travel distance of the object based on not only the noise-removed pulse signal by the selected corresponding filter means but also the unit travel distance.

9. A program storage device readable by a travel distance deriving apparatus for use in a navigation system for navigating a mobile object, embodying a program of deriving a travel distance of the object which travels, said method comprising the steps of:

calculating a travel velocity of the object which produces a pulse signal in response to a travel of the object on the basis of a number of pulses of the pulse signal per unit time;

calculating a plurality of unit travel distances corresponding to a plurality of travel states of the object at every travel state, said plurality of travel states being different from each other, said unit travel distance being a travel distance per pulse calculated by dividing the calculated travel velocity by the number of the pulses of the pulse signal per unit time;

memorizing individually the plurality of calculated unit travel distances;

selecting from the plurality of memorized unit travel distances the unit travel distance corresponding to the travel state of the object which is under travel; and deriving the travel distance of the object on the basis of the selected unit travel distance and the pulse signal.

10. A program storage device readable by a travel distance deriving apparatus for use in a navigation system for navigating a mobile object, embodying a program of deriving a travel distance of the object which travels, said method comprising the steps of:

calculating a travel velocity of the object which produces a pulse signal in response to a travel of the object on the basis of a number of pulses of the pulse signal per unit time;

calculating at every predetermined timing a unit travel distance being a travel distance per pulse calculated by dividing the calculated travel velocity by the number of the pulses of the pulse signal;

calculating an error between the current unit travel distance calculated this time and the last unit travel distance calculated last time;

updating the last unit travel distance by replacing the last unit travel distance with the current unit travel distance, if the calculated error is less than a preset specified threshold; and  deriving the travel distance of the object based on the updated last unit travel distance and the number of the pulses of the pulse signal.

11. A program storage device readable by a travel distance deriving apparatus for use in a navigation system for navigating a mobile object, embodying a program of deriving a travel distance of the object which travels, said method comprising the steps of:

measuring a forward travel velocity of the object under forward travel;

discriminating whether or not the measured forward travel velocity is greater than a preset specified velocity;

detecting a level of a backward travel signal indicative of a state of the object under backward travel, when the measured forward travel velocity is greater than the specified velocity; and  calculating the travel distance of the object independently of the travel distance of the object in a case that a level of the backward travel signal differs from the detected level.

12. A program storage device readable by a travel distance deriving apparatus for use in a navigation system for navigating a mobile object, embodying a program of deriving a travel distance of the object which travels, said method comprising the steps of:

calculating a travel velocity of the object which produces a pulse signal in response to a travel of the object on the basis of a number of pulses of the pulse signal per unit time;

calculating a unit travel distance being a travel distance per pulse calculated by dividing the calculated travel velocity by the number of the pulses of the pulse signal;

selecting, from a plurality of filter means having frequency bands different from each other in order to remove noise from the pulse signal, a corresponding one of the plurality of filter means having one of the frequency bands corresponding to the calculated unit travel distance; and  deriving the travel distance of the object based on not only the noise-removed pulse signal by the selected corresponding filter means but also the unit travel distance.

\* \* \* \* \*